(12) United States Patent
Luff et al.

(10) Patent No.: US 10,210,342 B2
(45) Date of Patent: *Feb. 19, 2019

(54) CENTRALIZED THROTTLING SERVICE

(71) Applicant: salesforce.com, inc., San Francisco, CA (US)

(72) Inventors: Michael Gordon Luff, Killamey Road (CA); Kang Li, Quispamsis (CA); Stuart Douglas McClune, Rothesay (CA)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,878

(22) Filed: Jul. 5, 2017

(65) Prior Publication Data

US 2017/0351873 A1    Dec. 7, 2017

Related U.S. Application Data

(63) Continuation of application No. 15/211,151, filed on Jul. 15, 2016, now Pat. No. 9,703,980, which is a continuation of application No. 14/701,890, filed on May 1, 2015, now Pat. No. 9,405,597.

(51) Int. Cl.

| G06F 9/46 | (2006.01) |
|---|---|
| G06F 21/62 | (2013.01) |
| G06F 9/54 | (2006.01) |
| G06F 21/33 | (2013.01) |
| G06F 21/44 | (2013.01) |

(52) U.S. Cl.
CPC ............ *G06F 21/6218* (2013.01); *G06F 9/54* (2013.01); *G06F 9/546* (2013.01); *G06F 21/335* (2013.01); *G06F 21/44* (2013.01); *G06F 2209/504* (2013.01); *Y02D 10/22* (2018.01)

(58) Field of Classification Search
CPC ................................ G06F 9/541; G06F 9/546
USPC ......................................... 719/313, 314, 328
See application file for complete search history.

(56) References Cited

U.S. PATENT DOCUMENTS

| 7,979,866 B2 | 7/2011 | Bose et al. | |
|---|---|---|---|
| 8,953,453 B1* | 2/2015 | Xiao | H04L 47/12 370/230 |
| 9,244,615 B2* | 1/2016 | Thereska | G06F 3/061 |
| 9,559,968 B2* | 1/2017 | Kulkarni | H04L 47/215 |
| 2012/0209946 A1 | 8/2012 | McClure et al. | |
| 2013/0042115 A1 | 2/2013 | Sweet et al. | |
| 2014/0269292 A1* | 9/2014 | Kalkunte | H04L 45/123 370/232 |
| 2015/0193600 A1 | 7/2015 | Matsuda | |
| 2015/0286834 A1 | 10/2015 | Ohtani et al. | |

(Continued)

*Primary Examiner* — Andy Ho
(74) *Attorney, Agent, or Firm* — Morris & Kamlay LLP

(57) ABSTRACT

A method and system are provided that may centralize the management of applications that access the data of social networks via API calls. A central service may generate tokens at a generation rate that permit an application to access an API. The tokens may be distributed to queues associated with certain content types. The relative distribution of tokens to each queue may be determined by rules. A queue may release tokens to applications that function to access the content type associated with the queue. The token generation rate and rules may be selected to prevent violation of the rate limits for the API.

16 Claims, 7 Drawing Sheets

(56) References Cited

U.S. PATENT DOCUMENTS

2015/0358310 A1   12/2015  Beckhardt et al.
2018/0034796 A1*   2/2018  Ross .................... H04W 12/06

* cited by examiner

CENTRALIZED THROTTLING SERVICE

BACKGROUND

Social networks grant and control access to their data through Application Programming Interfaces (APIs). For example, a social network typically provides various forms of basic data stored by the social network and/or analytical data generated based on data aggregated from multiple users via such an API. Social networks typically require any entity making use of the API to have an account that provides access to the API. The account is then used to gain access to the API. For example, a social network may maintain an API that permits applications of an external account, such as social media listening applications, to access the posts of the social network's users. APIs typically establish a limit on the rate at which an external account's applications may make calls to the API's data, for example to prevent malicious or unintentional over-use of the resources of the social network API. If this rate limit is exceeded, the social network typically will restrict the rate at which the account can make further API calls for a period of time, prevent the types of API calls available to the account, or impose other limits on API use by the same account.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

When accessing a social network's data as previously described, a single account may deploy multiple instances of its application, such as in multiple instances of a virtual machine. For example, a social media monitoring service may use a single account to access a social network via an API of the social network. When scaled to service multiple users, multiple instances of applications used by the social monitoring service may use a single account. Although each instance of the application may individually comply with the social network's API rate limit, the aggregate rate across all instances of the application may significantly exceed the limit. As a result the API may block further API calls by the account's applications.

To address these issues, the present disclosure sets forth methods and systems that may centralize the management of all instances of applications that access the data of social networks via API calls. These methods and systems may be implemented as a throttling service to prevent or manage API rate limit errors. An account may require all types of applications and instances of applications that access a particular source system to register with the throttling service. The throttling service may generate tokens that permit an application to access the API of the social network, which are distributed into queues having different rate limits and different associations with content types. The throttling service governs the token generation rate and the relative distribution of tokens into the queues, so that the account avoids rate limit violations even when access by multiple applications and/or application instances are considered in aggregate. If the account receives a rate limit violation, the throttling service may execute a backoff policy that limits or prevents further violations.

Figure 1:
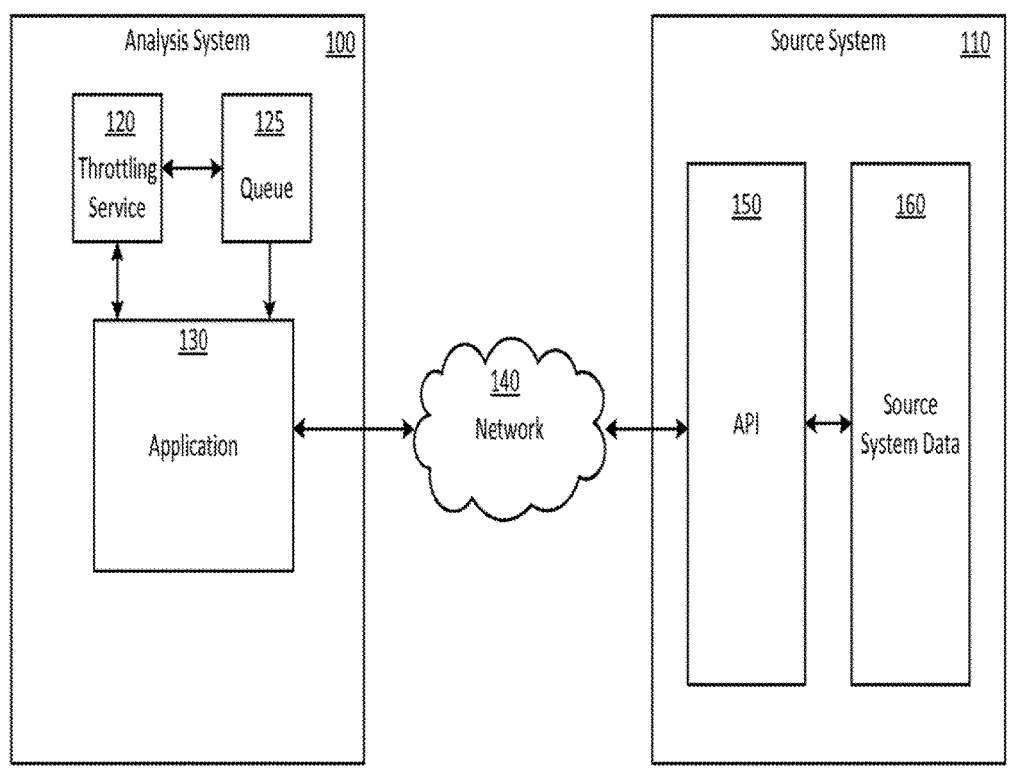
FIG. 1 shows an example system diagram of an analysis system and a source system according to an embodiment of the disclosed subject matter.

FIG. 1 shows an example system diagram as an example environment in which embodiments of the disclosed subject matter may operate. Analysis system 100 may be any computerized system associated with an account that includes application 130 for accessing the data of a social network. For example, an application 130 may be a social media listening application associated with an account and implemented across computers and databases coupled to a network in communication with a social network. A social network may include a social media service, an instant messaging service, or any other application that allows users to publish or transmit text messages, images, audio, video, user location, or other media messages to other users.

Application 130 may be any application suitable for capturing and/or analyzing content associated with social network. For example, application 130 may include processes for searching and capturing comments on videos posted on a social network. Content may include published content such as text, images, video, or audio posted by a user of a social network, or unpublished content such as a user's location, the time of day when a post is made, the number of a user's social network connections, a message sent by a user of an instant messaging service, or metadata associated with a user. In general, applications such as application 130 may monitor and/or collect general or specific messages that are transmitted or otherwise made available within a social network. The application also may filter the messages or other data to identify those that meet specific criteria, provide aggregate data about messages in a message stream, or perform other data collection and analytic functions based upon data obtained from the social network.

Source System 110 may be any computerized system that hosts, manages, and controls content on a social network. For example, an analysis system may include a social media website for hosting and connecting videos posted by users, which is implemented across computers and databases coupled to a network in communication with the internet. Such content may be stored in source system data 160 and accessed through API 150.

API 150 may be any set of specifications for routines, data structures, object classes, remote calls, variables, and the like that are exposed to application 130 in order to facilitate access to data, hardware, and other functionality of source system 110. APIs may have rate limits or quotas that are imposed by the source system 110. Rate limits may specify how many calls an external application may make within a specified period of time, referred to as a rate window, to the data or processes controlled by an API. When a rate limit is exceeded, the API may return a rate limit error instead of or in conjunction with other data that would normally be returned by the API, which indicates that a rate limit has been exceeded. A rate limit also may be referred to as a quota or a quota limit, and a rate limit error as a quota error or a quota limit error. In some cases, a rate limit may be specified by the provider of an API, but the API may not provide an indication of when such a limit has been reached by a particular account or application. In such cases an application accessing an API may appear to be malfunctioning since the API may not provide responses as expected by the application.

Queue 125 may be a store of tokens, each of which permit the application 130 to make an API call over network 140. Queues and applications may each be associated with a particular content type such that the applications may only capture a particular content type and queues may only transfer tokens to those types of applications.

A throttling service 120 operates in communication with queue 125 and application 130 to manage the rate at which application 130 makes API calls. For example, throttling service 120 may generate tokens and implement rules governing the distribution of the tokens into queue 125. Further details regarding the structure and operation of throttling service 120 are provided below.

Figure 2:
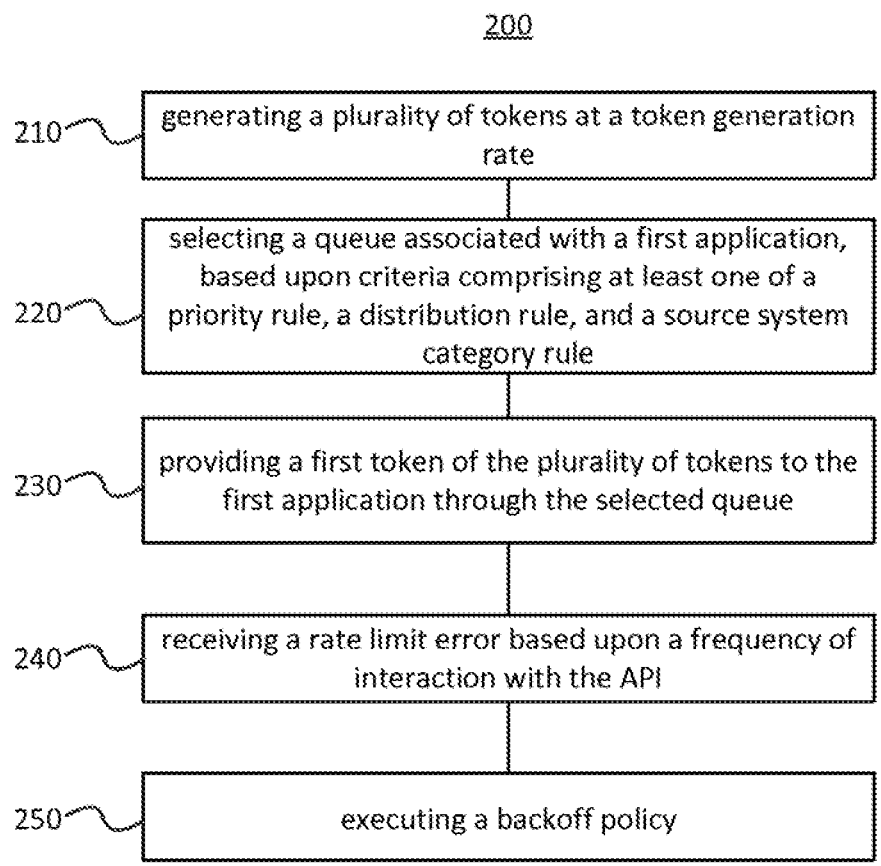
FIG. 2 shows an example flow diagram of a method for managing API rate limits according to an embodiment of the disclosed subject matter.

FIG. 2 shows an example flow diagram of a method 200 for managing API rate limits according to an embodiment of the disclosed subject matter, such as may be performed by a throttling service as disclosed herein. All applications for an account may be required to register with the throttling service and receive a token before making an API call. The throttling service may govern the token generation and distribution, and thereby govern the rate of API calls.

Method 200 may include generating a plurality of tokens at a token generation rate at 210. A token may be a string such as a JavaScript Object Notation (JSON) string, which contains a value and an expiration time. The token generation rate may be configured to issue tokens at a rate at or below the rate limit specified by a source system. The throttling service may also periodically request current rate limit policy updates from a source system such as system 110, and employ these updates as a basis for adjusting the token generation rate. For example, if the source system returns a rate limit policy update that reduces the number of API calls allowed from 100 to 80 API calls per hour, and the current token generation rate is 75 API calls per hour, then the throttling service may reduce the token generation rate by a value, such as 33%, to 50 API calls per hour in order to prevent a rate limit error. In addition, a token generation rate may be increased. For example if the source system returns a rate limit policy that is 80 API calls per hour and the current token generation rate is at a value less than 80, such as 50% less, then the token generation rate may be increased to a value, such as 80% of the rate limit policy, or 64 API calls per hour.

At 220, method 200 may include selecting a queue associated with an application. This selection may be based upon a range of criteria, including a priority rule and a distribution rule. A queue may be any process or component suitable to receive a token from a token generator and make that token available to an application. For example, a queue may be an instance of a server established to distribute tokens, such as a remote dictionary server, a remote data structure server, or any other suitable system. A queue may be associated with a particular content type such that it only distributes tokens to applications that access data with that content type. For example, a queue may be associated with user comments on a social network and only transfer tokens to applications that make API calls on user comments of the social network.

Implementations of method 200 may include selecting from amongst multiple queues or a single queue. For example, in implementations where rate limiting is being controlled solely through limits on the token generation rate, there may be only one queue and that single queue may always be selected. In other implementations a queue may be selected from amongst multiple options.

Selections of queues from amongst multiple queues may be based upon a range of criteria, including a priority rule and a distribution rule. For example, a source system may include a social network that allows users to post content such as text, audio, photos, video, and interactive games, as well as to comment on these posts. The source system may have one rate limit for posts that allows at most 60 API calls per hour and a second rate limit for comments that allows at most 40 API calls per hour. In au embodiment of method 200, a throttling service may generate a posts queue and a comments queue and configure the token generation rate to 100 tokens per hour based on configuration data received for the source system. A throttling service as previously described may then manage an application that captures data from users' posts and an application that captures data from users' comments. Continuing the example, the throttling service may be configured with criteria including a distribution rule that may specify that 60% of all API calls may be made by applications calling on post data and 40% of all API calls may be made by applications calling on comments data. In accordance with this rule, the throttling service may distribute tokens such that 60% of the tokens may be distributed to the posts queue and 40% of the tokens may be distributed to the comments queue. During a one hour rate limit window, a token generator may generate 100 tokens, which may allow 100 API calls. 60% of these calls may be made by the posts application and 40% may be made by the comments application. Therefore during the 1 hour rate limit window, 60 API calls may be made to posts content and 40 API calls may be made to comments content, and thus the account may comply with the source system rate limits.

Token distributions may be made by employing statistical distribution algorithms. A range of token distribution rules may be employed depending on the implementation and number of queues. For example a rule may require 20% to a first queue and 80% to a second queue; a rule may require 20% to a first queue, 50% to a second queue, and 30% to a third queue; a rule may require 2% to a first queue, 38% to a second queue, 15% to third queue, and 45% to a fourth queue, and so forth.

In another example having a posts queue and a comments queue, a priority rule may specify that if both queues are empty, the next available token is transferred to the posts queue over the comments queue. In other words, a token is transferred to the comments queue only if the posts queue already has a token. Such configurations may be desirable in circumstances, for example, where the account is designed to capture as much post data as possible and only capture comment data if there is no post data available. Additional examples of suitable rules are discussed in later portions of this disclosure.

Continuing the example, method 200 may provide a token to an application through a selected queue at 230. For example, an application that captures data from user posts may wait at a posts queue until the posts queue receives a token from the token generator and passes that token to the application. Once the application receives the token it may make an API call.

In some embodiments of method 200, configurations of the token generation rate and rules may not prevent a source system from issuing a rate limit error. For example, the rate limit of a source system may be dynamic and vary for reasons undetectable to an analysis system. In circumstances such as this, embodiments of this disclosure may receive a rate limit error at 240 and execute a backoff policy at 250 to reduce the rate of API calls. For example, the backoff policy may reduce the token generation rate or pause the generation of new tokens entirely. Additional examples of suitable backoff policies are discussed in latter portions of this disclosure.

Figures 3A, 3B, 3C, 3D:
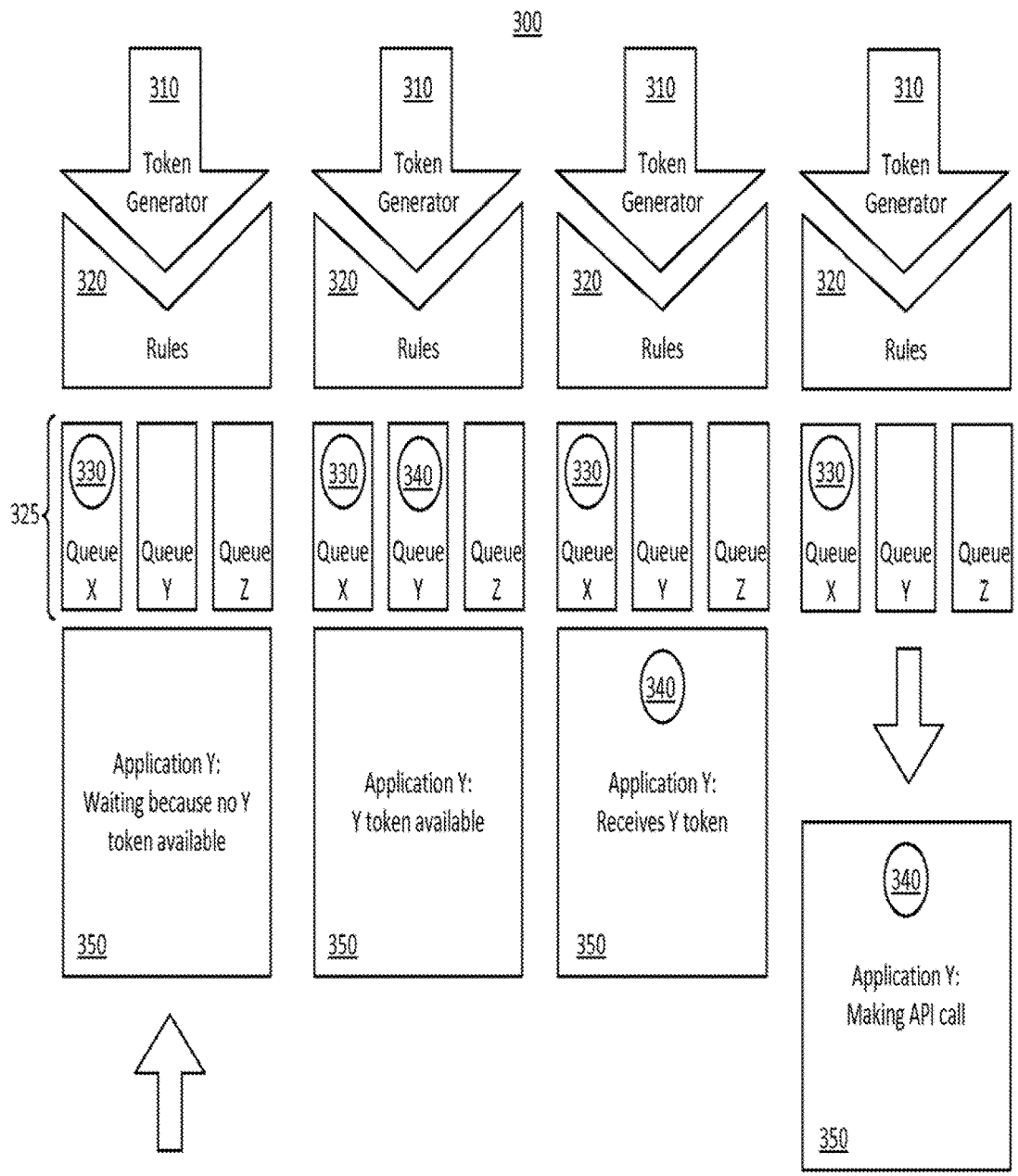
FIG. 3A shows an example token distribution process according to an embodiment of the disclosed subject matter.
FIG. 3B shows an example token distribution process according to an embodiment of the disclosed subject matter.
FIG. 3C shows an example token distribution process according to an embodiment of the disclosed subject matter.
FIG. 3D shows an example token distribution process according to an embodiment of the disclosed subject matter.

FIGS. 3A-3D show an example token distribution process 300 according to an embodiment of the disclosed subject matter. In FIG. 3A, application Y 350 may be associated with content type Y. Application Y may wait for token generator 320 to generate a token and distribute it to queue Y at 325. Queue Y may also be associated with content type Y. In FIG. 3B, token 340 may be transferred to queue Y in accordance with rules 320. In FIG. 3C, token 340 may be transferred from queue Y to application Y. In FIG. 3D, application Y may possess token 340 and proceed to make an API call on content type Y.

Rules 300 may be rate limits set by the API for certain functions, such as source system category rules. For example, a source system category rule may include: a rate limit for a user of the source system, a rate limit for a category of users of the source system, a rate limit for a category of published content of users of the source system, or a rate limit for a category of unpublished content of users of the source system. In embodiments employing source system category rules, the throttling service may govern rate limits for applicable categories first by the overall token generation rate and second by a rate limit rule for that category.

In an example, an API may specify a rate limit for a category of publications of users of a source system, for example a call that returns all relevant posts on a social media network that match a specified query. For example the call could be titled "get_search/posts," and it may return all user posts relevant to the search term "dog." In FIGS. 3A-3D queue Y may be generated as the queue that transfers tokens for applications that make get_search/posts requests, and application Y may be designated as the type of application that makes get_search/posts requests. The social network may limit the number times a get_search/posts call may be made to 15 get_search/posts calls per account per 15 minute window. A rule based on the get_search/posts limit may limit the rate tokens are distributed to queue Y such that no more than 15 tokens are transferred to queue Y in a 15 minute window, regardless of the overall token generation rate. In this way all applications that make get_search/posts calls may be limited to making at most 15 get_search/posts calls in every 15 minute window. The rate limit of the rule may match the API specified rate limit or it may be more or less frequent. For example, in order to further ensure that rate limits are not violated, the get_search/posts limit may be reduced to 12 calls every 15 minutes.

In another example an API may specify a call that returns all data representing all posts on the "timelines" of users that match a specified query. For example the call could be titled "get_user_timeline," and it could return all timelines from users that match a query for "age 18-34." In FIGS. 3A-3D queue Z may be generated as the queue that transfers tokens for applications that make get_user_timeline requests. The API of the social network may limit the number of times this call may be made to a particular user's timeline or group of user's timelines to 30 get_user_timeline calls per account, per 15 minute window. A rule based on the get_user_timeline limit may limit the rate at which tokens are distributed to queue Z such that no more than 30 tokens are transferred to queue Z every 15 minutes. In this way all applications that make get_user_timeline requests may be limited to making at most 30 get_user_timeline calls in every 15 minute window.

In an example, an API may specify a rate limit for a category of unpublished content of the source system, such as a call that returns all data representing the "friends" connected to a particular user on a social network. For example the call could be titled "get_friends/list." In FIGS. 3A-3D queue X may be generated as the queue that transfers tokens for applications that make get_friends/list requests. The social network may limit the number of times this call may be made to 30 get_friends/lists request per account per 15 minute window. A rule based on the get_friends/lists limit may limit the rate tokens are distributed to queue X such that no more than 30 tokens are transferred to queue X every 15 minutes. In this way all applications that make get_friends/lists requests may be limited to making at most 30 get_friends/lists calls in every 15 minute window. Other unpublished content may also be specified as a call type for an API, such as, for example, metadata related to the locations where posts are made or times of day when posts are made.

Some source system APIs may enforce rate limits at the user level. For example, a social network may limit the number of API calls to 1 calls per 15 minute window for status posts of each user of the social network or for each user within a certain category, such as users deemed to be "influencers." In these circumstances, an embodiment of the disclosed subject matter may, for example, create a queue as a database instance for each user. For example, the queue may specify the user's username or ID and the source and category of content authorized. A rule for this queue may be set that limits token transfers to 15 tokens per 15 minute window. Applications configured to make a call for a specific user's data may then be required to request a token from the specific user's queue and thus be limited to 15 tokens per 15 minute window. User data of the social network may change over time and user queues may frequently be removed and new queues may be established. User queue specifications and rule specifications may be received by the throttling service as a regularly updated thread or as updated configuration data.

In some embodiments, multiple rules may operate in combination to determine the overall distribution of tokens. For example, an analysis system may employ applications that access user post data and user comments data on a social network and include a post queue and a comments queue. The analysis system may include a priority rule that requires an available token to be distributed to the posts queue before the comments queue unless the posts queue already has a token. However, the analysis system may also include a distribution rule that requires no more than 60% of the tokens in a one hour window to be distributed to the posts queue. The token generation rate may be set to distribute 100 tokens per hour and then reset. The rules may then function in combination such that the priority rule may take precedence and transfer with priority, tokens to the posts queue. If the posts queue receives 60 tokens before the expiration of the window, then all other tokens generated in the period may be distributed to the comments queue.

In another example, an application may be eligible to receive tokens from multiple queues. For example, a single application may be authorized to make calls to both posts and comments in a social network. A throttling service may be implemented with a posts queue and a comments queue, a token generation rate, and a rule that distributes tokens equally amongst all queues. The throttling service may receive configuration data including a list specifying priority amongst queues for specific applications. An application may register with the throttling service and receive the queue priority list. The application may submit the list back to the throttling service when the application requests a token. The list may be used as a key by the throttling service to authenticate the application. When requesting a token, the application may issue a command in reference to the queue priority list. The throttling service may then attempt to transfer a token to the application from each queue in the queue priority list according to the queue's priority. If no token is available after completing the list, then the application may be blocked from further API calls until a token is distributed into a queue and transferred to the application. As a specific example, in an embodiment in which a dictionary server or other key-value store is used to manage tokens, a blocking list pop primitive (BLPOP) type command structure may be used to retrieve tokens. Other applications in the same analysis system may receive different queue priority lists.

Figure 4:
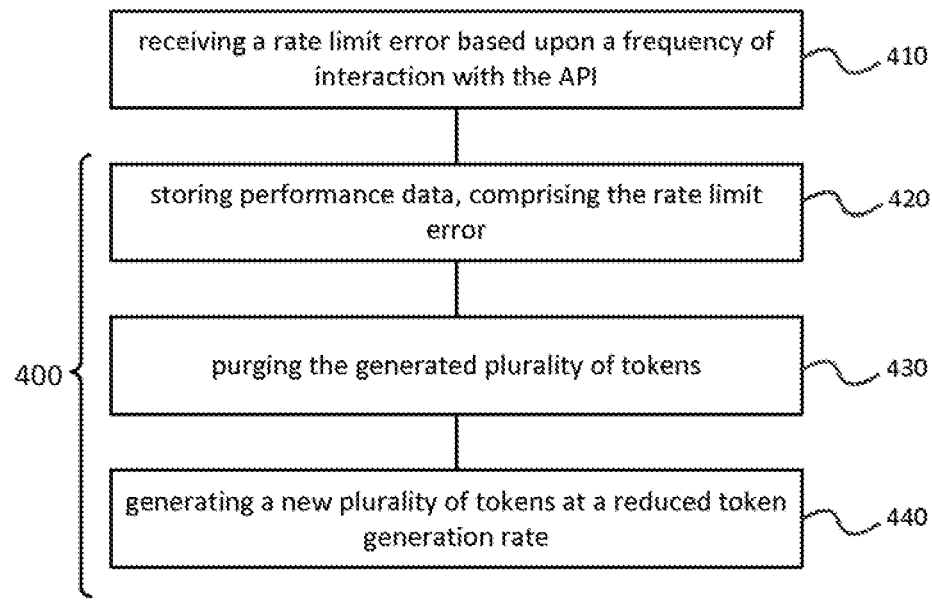
FIG. 4 shows an example flow diagram of a method for executing a backoff policy according to an embodiment of the disclosed subject matter.

In circumstances where a rate limit error is received, embodiments of this disclosure may invoke a backoff policy that begins to issue tokens at a slower rate or pauses queues until it is safe to ramp back up to initial token generation rates. The throttling service may also establish channels within the database instances storing the queue servers, through which applications may publish messages indicating rate limit errors and performance statistics. FIG. 4 shows an example flow diagram of a method 400 for executing a backoff policy according to an embodiment of the disclosed subject matter. At 410 a throttling service may receive a rate limit error from a source system. For example, an application may receive the rate limit error from the source system and publish the rate limit error to a channel in a queuing server. The throttling service may subscribe to this channel to receive the rate limit error.

The method 400 for executing the backoff policy may optionally store performance data, including the rate limit error at 420. The performance data may include information such as the token generation rate, rules, applications, and source systems that were operating at the time the rate limit error was received, as well as the rate limit error itself. The method 400 may also periodically collect performance data in circumstances where there is no rate limit error received. Performance data may be used to adjust or optimize aspects of the throttling service, or the performance data may be stored and distributed to other systems. For example, an application may publish performance data as a JSON document to a performance data channel in a queuing server and thereby communicate it to the throttling service.

Upon receipt of a rate limit error, the method 400 may purge the generated tokens from the queue at 430 and generate new tokens at a reduced token generation rate at 440. For example, a rate limit error may be received that indicates a rate limit of 80 calls per 15 minute window has been exceed. The new token generation rate may be reduced to a frequency below 80 calls per 15 minute window, such as 70 calls per 15 minute window. In another example, after receiving a rate limit error that did not indicate the current source system rate limit, an application of an analysis system may make an API call that returns the current source system rate limit. The new token generation rate may be selected to be at a frequency below the current source system rate. In another example, a new token generation rate may be set as an exponential backoff rate. For example, the new token generation rate may be an exponentially decreasing rate, such that for each rate limit error received, a new token generation rate may be generated that has an exponentially increasing probability that the delay between the generation of individual tokens will be increased.

In some circumstances, method 400 may purge all existing tokens and pause the service for a period of time. For example, it may be known that the source system "blacklists" or denies API access to applications entirely or for a specific period of time after the source system issues a rate limit error. In another example a received rate limit error may specify a period of time before the source system will allow further API calls. Also, as above, a further API call may be permitted to return the current rate limits for the source system as well as any blacklist time periods. Any or all of this information may be used as a basis for which the backoff policy selects a suspension time period. For example if it is known that the source system automatically suspends further API calls for one hour after issuing a rate limit error, then the back off policy may suspend issuance of further tokens until an hour has expired information about a specific source system, including the policies applied to API usage, may be stored in a source configuration for the source system, which may be retrieved in specific instances to determine when and how a backoff policy should be implemented.

Figure 5:
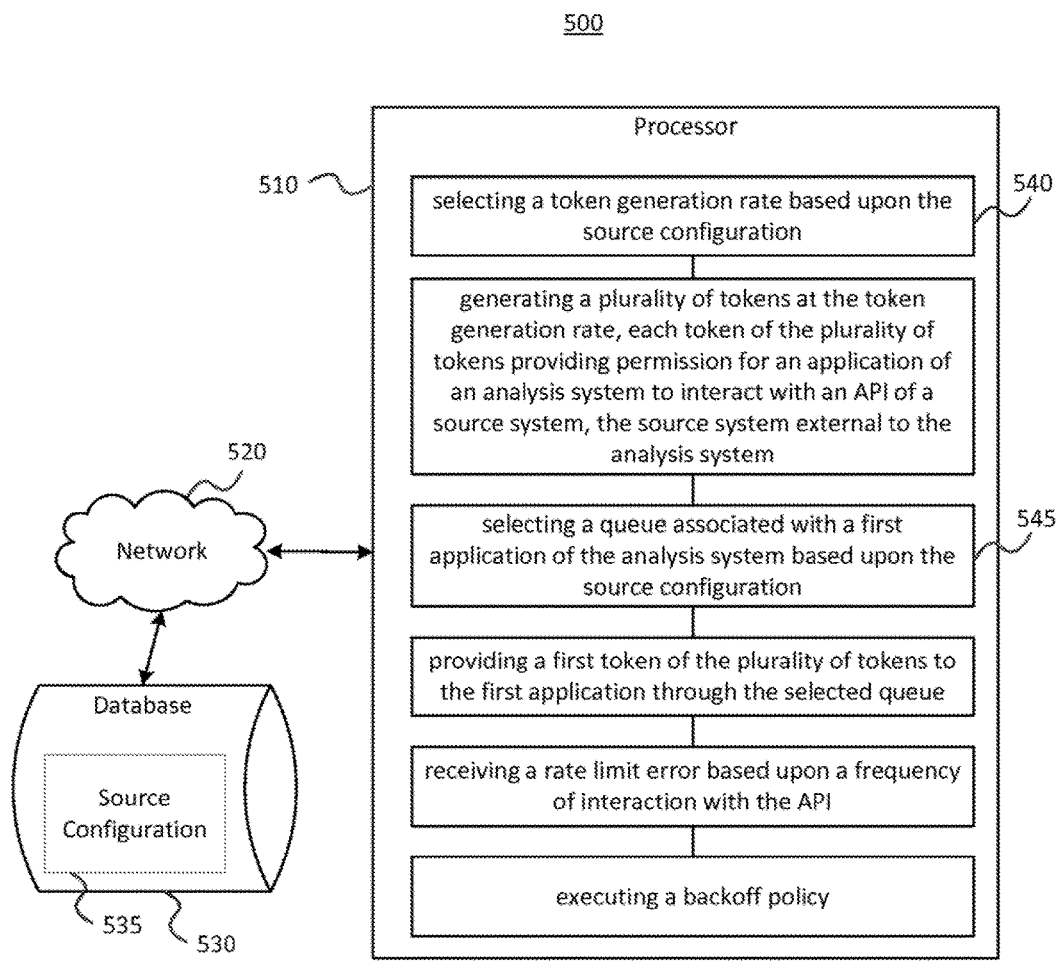
FIG. 5 shows an example system diagram of a system for managing API rate limits according to an embodiment of the disclosed subject matter.

Aspects of the disclosed subject matter may be implemented in and used with a variety of component and network architectures. For example, FIG. 5 shows an example system diagram of a system 500 for managing API rate limits according to an embodiment of the disclosed subject matter. System 500 may include a database 530 storing a source configuration 535 and a processor 510 in communication with the database, such as through network 520.

Source configuration 535 may include a range of specifications for interacting with a source system. For example, the source configuration may include the source system and content types, queue types for the source content types, a source token generation rate, a source backoff policy, and rules for determining token distribution, such as an application priority rule, an application distribution rule, and/or a source system category rule. The source configuration may be received by the throttling service or it may be preloaded on a database accessible to the throttling service. Once a source configuration is loaded, it may create the queues specified in the source configuration and otherwise prepare the throttling service for interacting with applications.

In some embodiments, applications as disclosed herein may be required to register with the throttling service before making API calls. For example, a socket server and listener may be initiated when the throttling service is started. The listener may process socket messages received by the socket server that contain a registration request by an application. When a registration request is received, the throttling service may authenticate the application to ensure it is approved for the source system. If the application is approved, the service may then make queue data and rules data available to the application, as well as data specifying channels through which to publish rate limit errors and performance statistics and data. For example, the throttling service may publish a JSON document to the application containing queue data, rules data, a rate limit error channel, and a performance statistics channel. The application may then configure a queueing server client and employ the queueing server to request tokens.

Continuing the example, once the source configuration is loaded and applications are registered, processor 240 executes instructions for selecting a token generation rate based upon the source configuration at 540. For example, the source configuration may include a source rate limit. The token generation rate may be based on the source configuration by, for example, matching the source rate limit or undercutting the source rate limit by a selected value, such as 20%. As another example, the token generation rate may be based on the source configuration by defaulting to a rate specified by the analysis system unless the default rate exceeded the source configuration rate.

At 545, the processor 240 executes instructions for selecting a queue associated with an application of an analysis system based upon the source configuration. As discussed above, the source configuration may include queue types for the source content types and rules for determining token distribution, such as an application priority rule, an application distribution rule, or a source system category rule. Therefore the queue may be selected based upon the source configuration, by, for example, applying an application priority rule, an application distribution rule, and/or a source system category rule provided by the source configuration. Methods as set forth in this disclosure may be implemented in suitable systems, such as system 500.

As discussed above, APIs of certain source systems may enforce user level and account or application level rate limits. For example, in an embodiment, a total number of users of the source system may be retrieved from a database that maintains a thread that periodically pulls user data from the source system and establishes token queues for each user. The total number of users returned may be multiplied by the user level rate limit to return a daily total rate limit for all users. The daily user total rate limit may be compared to the account level daily rate limit. If the user daily total rate limit exceeds the account level daily rate limit, then the daily user total rate or an equivalent, such as a per second rate limit, may be set as a source system category rule for the queues generated for users. An instance of the throttling service may be created tot each user along with a user-specific queue and backoff policy. The instances of the throttling service may be mapped to provide management functionality. If a rate limit error occurs, it may be linked to a specific user. Therefore the tokens of that specific user's queue may be purged in whole or in part, or another backoff policy may be executed. The other users' data may remain freely accessible via the source system API.

Figure 6:
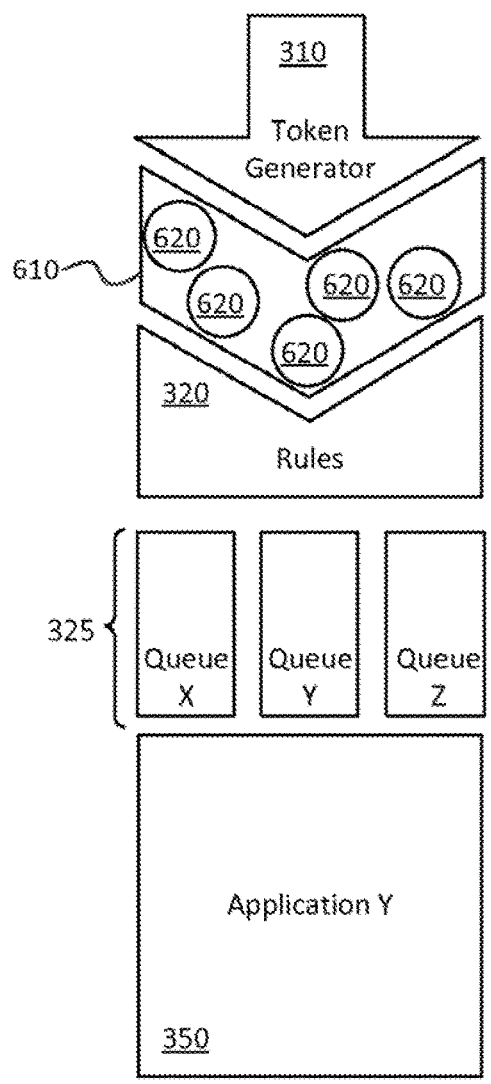
FIG. 6 shows an example token distribution process implementing a token cache according to an embodiment of the disclosed subject matter.

In certain embodiments it may be advantageous to issue tokens at a faster rate than the token generator may be capable of performing. A token cache may be employed to store a quantity of pre-generated tokens and make the tokens available to queues. FIG. 6 shows an example token distribution process 600 implementing a token cache 610 according to an embodiment of the disclosed subject matter. The token cache 610 is shown containing a quantity of pre generated tokens 620. Pre-generated tokens may be pushed all at once to queues 315 in a quantity that exceeds the token generation rate.

Figure 7:
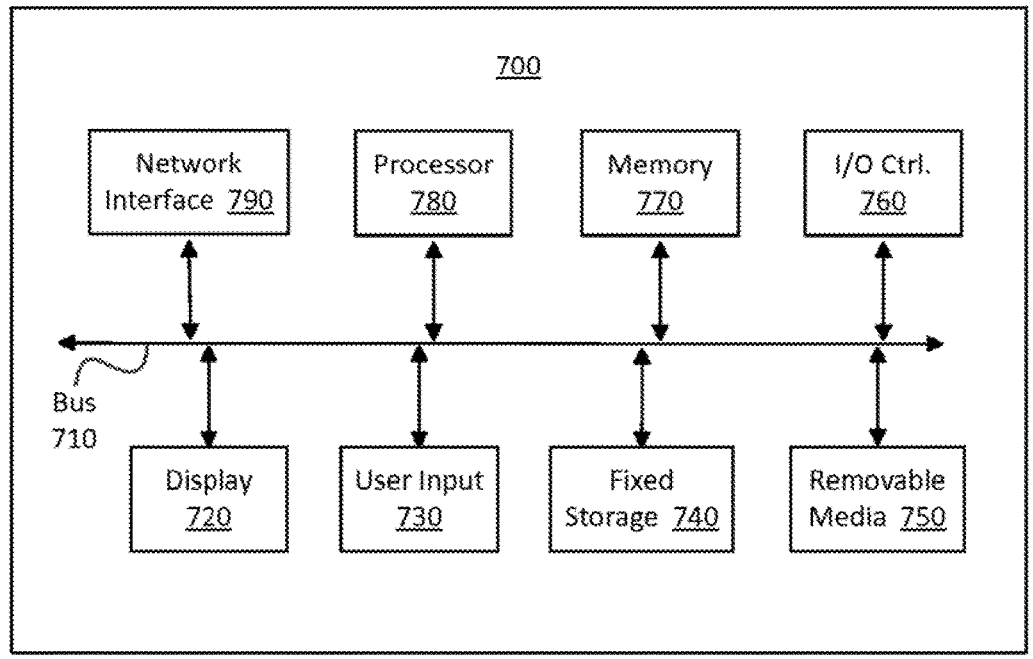
FIG. 7 shows an example computer suitable for implementations of embodiments of the disclosed subject matter.

Implementations of the presently disclosed subject matter may be implemented in and used with a variety of component and network architectures. FIG. 7 is an example computer 700 suitable for implementations of the presently disclosed subject matter. The computer 700 includes a bus 710 which interconnects major components of the computer 700, such as a central processor 780, a memory 770 (typically RAM, but which may also include ROM, flash RAM, or the like), an input/output controller 760, a user display 720, such as a display screen via a display adapter, a user input interface 730, which may include one or more controllers and associated user input devices such as a keyboard, mouse, and the like, and may be closely coupled to the I/O controller 760, fixed storage 740, such as a hard drive, flash storage, Fibre Channel network, SAN device, SCSI device, and the like, and a removable media component 750 operative to control and receive an optical disk, flash drive, and the like.

The bus 710 allows data communication between the central processor 780 and the memory 770, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 700 are generally stored on and accessed via a computer readable medium, such as a hard disk drive (e.g., fixed storage 740), an optical drive, floppy disk, or other storage medium.

The fixed storage 730 may be integral with the computer 700 or may be separate and accessed through other interfaces. A network interface 790 may provide a direct connection to a remote server via a telephone link, to the Internet via an internet service provider (ISP), or a direct connection to a remote server via a direct network link to the Internet via a POP (point of presence) or other technique. The network interface 790 may provide such connection using wireless techniques, including digital cellular telephone connection, Cellular Digital Packet Data (CDPD) connection, digital satellite data connection or the like. For example, the network interface 790 may allow the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 770, fixed storage 740, removable media 750, or on a remote storage location.

Figure 8:
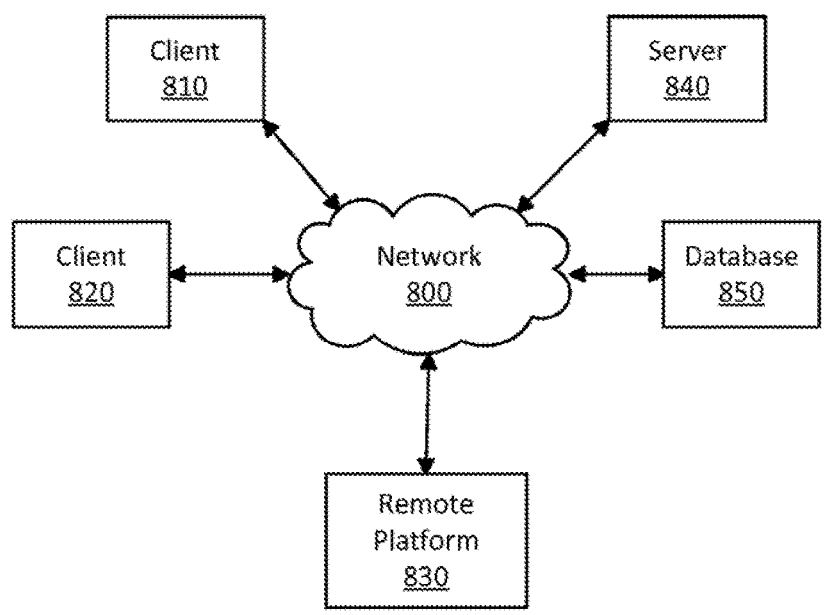
FIG. 8 shows an example network arrangement suitable for implementations of embodiments of the disclosed subject matter.

FIG. 8 shows an example network arrangement according to an implementation of the disclosed subject matter. One or more clients 810, 820, such as local computers, smart phones, tablet computing devices, and the like may connect to other devices via one or more networks 800. The network may be a local network, wide-area network, the Internet, or any other suitable communication network or networks, and may be implemented on any suitable platform including wired and/or wireless networks. The clients may communicate with one or more servers 840 and/or databases 850. The devices may be directly accessible by the clients 810, 820, or one or more other devices may provide intermediary access such as where a server 840 provides access to resources stored in a database 850. The clients 810, 820 also may access remote platforms 830 or services provided by remote platforms 830 such as cloud computing arrangements and services. The remote platform 830 may include one or more servers 840 and/or databases 850.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    generating, by a computing device, a first plurality of tokens at a first generation rate, each token configured to provide permission for a corresponding instance of an application to interact with an application programming interface (API) of a system that is distinct from the computing device;
    receiving, by the computing device and from the system, an indication that the corresponding instance of the application has interacted with the system at a rate that exceeds a limit;
    generating, by the computing device and in response to a reception of the indication, a second plurality of tokens at a second generation rate, the second generation rate being less than the first token generation rate; and
    deleting, by the computing device, the first plurality of tokens rather than using the first plurality of tokens.

2. A method comprising:
    generating, by a computing device, a plurality of tokens, each token configured to provide permission for a corresponding instance of an application to interact with an application programming interface (API) of a system that is distinct from the computing device;
    distributing, by the computing device, the plurality of tokens into a plurality of queues, a first queue, of the plurality of queues, associated with a first content type, a second queue, of the plurality of queues, associated with a second content type;
    selecting, by the computing device and based on a content type associated with the application, an appropriate queue of the plurality of queues; and
    providing, by the computing device and via the appropriate queue, a token, of the plurality of tokens, to an instance of the application.

3. The method of claim 2, wherein the generating is performed at a token generation rate.

4. A first system comprising:
    a memory configured to store instructions and tokens; and
    a processor coupled to the memory and configured to process the instructions:
        to generate the tokens,
        to store the tokens in the memory,
        to retrieve the tokens from the memory, wherein the instructions to retrieve the tokens include instructions associated with a first type of content and instructions associated with a second type of content, and
        to make, under a control of a token of the tokens, a call, via an electronic network to an application programming interface of a second system, to receive a content associated with the second system, wherein the content includes the first type of content and the second type of content, and the instructions to make the call include instructions to make the call to receive the first type of content and instructions to make the call to receive the second type of content.

5. The first system of claim 4, wherein the instructions to make the call comprise a social media listening application.

6. The first system of claim 4, wherein the application programming interface is configured to limit a number of calls, within a period of time, for the content to a first rate.

7. The first system of claim 6, wherein the processor is further configured to receive, via the electronic network, a message from the second system, the message including information that indicates that the first rate has been exceeded.

8. The first system of claim 6, wherein the instructions to make, under the control of the token, the call comprise instructions to make, at a second rate controlled by the token, the call.

9. The first system of claim 8, wherein the second rate is less than the first rate.

10. The first system of claim 8, wherein the instructions to generate the tokens comprise instructions to generate the tokens at the second rate.

11. The first system of claim 10, wherein the processor is further configured to process:
instructions to send, via the electronic network, a first message to the second system, the first message including a request for the first rate;
instructions to receive, via the electronic network, a second message from the second system, the second message including information that indicates the first rate; and
instructions to change, in response to a receipt of the information that indicated the first rate, the second rate.

12. The first system of claim 10, wherein the instructions associated with the first type of content are configured to distribute the tokens only to the instructions to make the call to receive the first type of content.

13. The first system of claim 12, wherein the first type of content comprises at least one of a published text file, a published image file, a published video file, a published audio file, a location of user device, a time of day at which a post occurred, a number of a social network connection, an instant messaging service message, or metadata associated with a user.

14. The first system of claim 12, wherein the first rate comprises a first type of content first rate and a second type of content first rate, and wherein the second rate comprise a first type of content second rate and a second type of content second rate.

15. The first system of claim 14, wherein the memory comprises a first portion and a second portion, the first portion associated with the first type of content, the second portion associated with the second type of content, and wherein the instructions to store the tokens comprise instructions to store the tokens in the first portion at the first type of content second rate and instructions to store the tokens in the second portion at the second type of content second rate.

16. The first system of claim 15, wherein the processor is further configured to process instructions to determine that both the first portion and the second portion lack the tokens, and wherein the instructions to store the tokens comprise instructions to store, in response to a determination that both the first portion and the second portion lack the tokens, a next generated token of the tokens in the first portion.

* * * * *